(12) United States Patent
Koyama

(10) Patent No.: US 12,230,754 B2
(45) Date of Patent: Feb. 18, 2025

(54) ALL-SOLID-STATE BATTERY

(71) Applicant: SAMSUNG ELECTRO-MECHANICS CO., LTD., Suwon-si (KR)

(72) Inventor: Masaki Koyama, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 357 days.

(21) Appl. No.: 17/480,737

(22) Filed: Sep. 21, 2021

(65) Prior Publication Data

US 2022/0166060 A1    May 26, 2022

(30) Foreign Application Priority Data

Nov. 25, 2020  (KR) .................. 10-2020-0159852

(51) Int. Cl.
  *H01M 10/0562*    (2010.01)
  *H01M 10/0525*    (2010.01)
(52) U.S. Cl.
  CPC ... H01M 10/0562 (2013.01); H01M 10/0525 (2013.01)
(58) Field of Classification Search
  CPC . H01M 10/0562; H01M 10/0525; H01G 4/01
  See application file for complete search history.

(56) References Cited

U.S. PATENT DOCUMENTS

| | | | |
|---|---|---|---|
| 2015/0131194 A1* | 5/2015 | Park | H01G 4/40 361/275.3 |
| 2020/0020974 A1 | 1/2020 | Shimizu et al. | |
| 2020/0388888 A1* | 12/2020 | Mikami | G06N 3/048 |

FOREIGN PATENT DOCUMENTS

| | | | |
|---|---|---|---|
| JP | 2015-220105 A | | 12/2015 |
| JP | 2019185973 A | * | 10/2019 |
| JP | 2020-115450 A | | 7/2020 |
| KR | 10-2017-0135180 A | | 12/2017 |
| WO | 2018/203474 A1 | | 11/2018 |

OTHER PUBLICATIONS

Machine translation of JP-2019185973-A (Year: 2023).*
Kinsella, C. E., et al. Applied Energy 114 (2014): 80-90 (Year: 2014).*

* cited by examiner

*Primary Examiner* — Milton I Cano
*Assistant Examiner* — Albert Michael Hilton
(74) *Attorney, Agent, or Firm* — Morgan, Lewis & Bockius LLP

(57) ABSTRACT

An all-solid-state battery includes an electrode assembly including a solid electrolyte layer, a first battery unit having a first negative electrode and a first positive electrode, and a second battery unit having a second negative electrode and a second positive electrode, in which the first negative and positive electrodes and the second negative and positive electrodes are respectively stacked with the solid electrolyte layer interposed therebetween. The all-solid-state battery further includes a first external electrode; a second external electrode; a third external electrode; and a fourth external electrode, in which the second battery unit is disposed to be adjacent to at least one the fifth surface or the sixth surface of the electrode assembly, and the first battery unit is located further inside than the second battery unit in the third direction.

4 Claims, 21 Drawing Sheets

ALL-SOLID-STATE BATTERY

CROSS-REFERENCE TO RELATED APPLICATION(S)

This application claims the benefit of priority to Korean Patent Application No. 10-2020-0159852, filed on Nov. 25, 2020 in the Korean Intellectual Property Office, the disclosure of which is incorporated herein by reference in its entirety.

TECHNICAL FIELD

The present disclosure relates to an all-solid-state battery.

BACKGROUND

Recently, devices using electricity as an energy source are increasing. With the expansion of applications of devices using electricity as an energy source, such as smartphones, camcorders, notebook PCs, electric vehicles, or the like, interest in electric storage devices using electrochemical elements is increasing. Among various electrochemical elements, lithium secondary batteries that may be charged and discharged, have a high operating voltage, and have a large energy density, have been in the spotlight.

A lithium secondary battery may be manufactured by applying a material capable of intercalating and de-intercalating lithium ions into a positive electrode and a negative electrode, and injecting a liquid electrolyte between the positive electrode and the negative electrode, and electricity may be generated or consumed by the reduction or oxidation reaction of the lithium secondary battery intercalating and de-intercalating the lithium ions in the negative electrode and the positive electrode. Such a lithium secondary battery should basically be stable in the operating voltage range of the battery, and should have performance capable of transferring ions at a sufficiently high rate.

When a liquid electrolyte, such as a nonaqueous electrolyte, is used in the lithium secondary battery, the discharge capacity and the energy density may be advantageously high. However, since high voltage lithium secondary batteries are difficult to implement, there may be problems such as relatively high risk of electrolyte leakage, fires, and explosions.

In order to solve the above problems, a secondary battery using a solid electrolyte, instead of a liquid electrolyte, has been proposed as an alternative. The solid electrolyte may be classified as a polymer-based solid electrolyte and a ceramic-based solid electrolyte, among which the ceramic-based solid electrolyte has an advantage of illustrating high stability. However, in the case of the ceramic-based solid electrolyte, there may be a problem that ion conductivity is lowered or charge/discharge efficiency is lowered due to poor interface contact between an electrolyte and an electrode, an interfacial side reaction, or the like. In addition, there are problems that dendrites may grow due to ion concentration in an end portion of an electrode assembly, or dielectric breakdown may occur due to concentration of an electric field in the end portion.

SUMMARY

An aspect of the present disclosure is to provide an all-solid-state battery capable of suppressing dendrite growth.

Another aspect of the present disclosure is to provide an all-solid-state battery capable of preventing damage due to overcharging.

Another aspect of the present disclosure is to provide an all-solid-state battery having improved electrical properties.

According to an aspect of the present disclosure, an all-solid-state battery includes an electrode assembly including first and second surfaces opposing in a first direction, third and fourth surfaces opposing in a second direction, and fifth and sixth surfaces opposing in a third direction, and including a solid electrolyte layer, a first battery unit having a first negative electrode and a first positive electrode, and a second battery unit having a second negative electrode and a second positive electrode, the first negative and positive electrodes and the second negative and positive electrodes being respectively stacked in the third direction with the solid electrolyte layer interposed therebetween; a first external electrode connected to the first negative electrode and disposed on the first surface of the electrode assembly; a second external electrode connected to the first positive electrode and disposed on the second surface of the electrode assembly; a third external electrode connected to the second negative electrode and disposed on the third surface of the electrode assembly; and a fourth external electrode connected to the second positive electrode and disposed on the fourth surface of the electrode assembly. The second battery unit is disposed to be adjacent to at least one of the fifth surface or the sixth surface of the electrode assembly, and the first battery unit is located further inside than the second battery unit in the third direction.

According to another aspect of the present disclosure, an all-solid-state battery includes an electrode assembly including first and second surfaces opposing in a first direction, third and fourth surfaces opposing in a second direction, and fifth and sixth surfaces opposing in a third direction, and including a solid electrolyte layer, a third battery unit having a third negative electrode and a third positive electrode, and a fourth battery unit having a fourth positive electrode and a fourth negative electrode, the third negative and positive electrodes and the fourth negative and positive electrodes being respectively stacked in the third direction with the solid electrolyte layer interposed therebetween; a first external electrode connected to the third negative electrode and disposed on the first surface of the electrode assembly; a second external electrode connected to the third positive electrode and disposed on the second surface of the electrode assembly; a third external electrode connected to the fourth negative electrode and disposed on the third surface of the electrode assembly; and a fourth external electrode connected to the fourth positive electrode and disposed on the fourth surface of the electrode assembly. At least one pair, among a pair of the third negative electrode and the fourth negative electrode and a pair of the third positive electrode and the fourth positive electrode, is disposed on the same layer.

According to another aspect of the present disclosure, an all-solid-state battery includes an electrode assembly comprising: a first negative electrode and a first positive electrode alternately stacked in a stacking direction with a solid electrolyte layer interposed therebetween, and exposed to two end surfaces of the electrode assembly opposing each other in a length direction perpendicular to the stacking direction; and a second negative electrode and a second positive electrode alternately stacked in the stacking direction with a solid electrolyte layer interposed therebetween, and exposed to two side surfaces of the electrode assembly opposing each other in a width direction perpendicular to the length and stacking directions; first and second external electrodes disposed on the two end surfaces of the electrode assembly and connected to the first negative and positive electrodes, respectively; and third and fourth external electrodes disposed on the two side surfaces of the electrode assembly and connected to the second negative and positive electrodes, respectively. The first negative and positive electrodes are disposed between one group of the second negative and positive electrodes and another group of the second negative and positive electrodes in the stacking direction.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
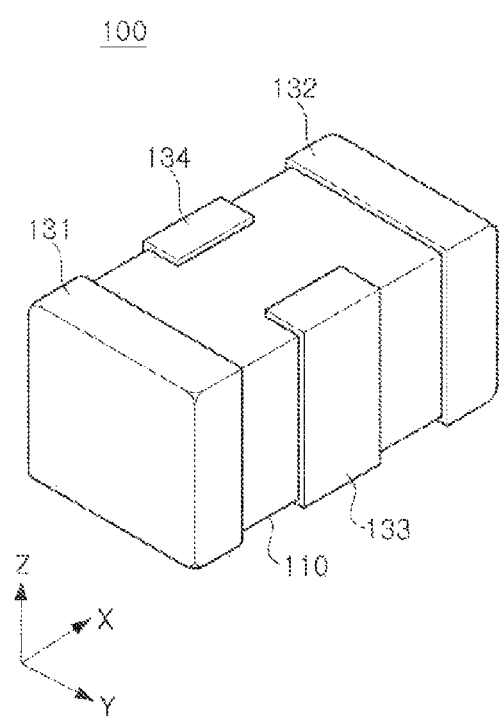
FIG. 1 is a perspective view schematically illustrating an all-solid-state battery according to an embodiment of the present disclosure.
Figure 2:
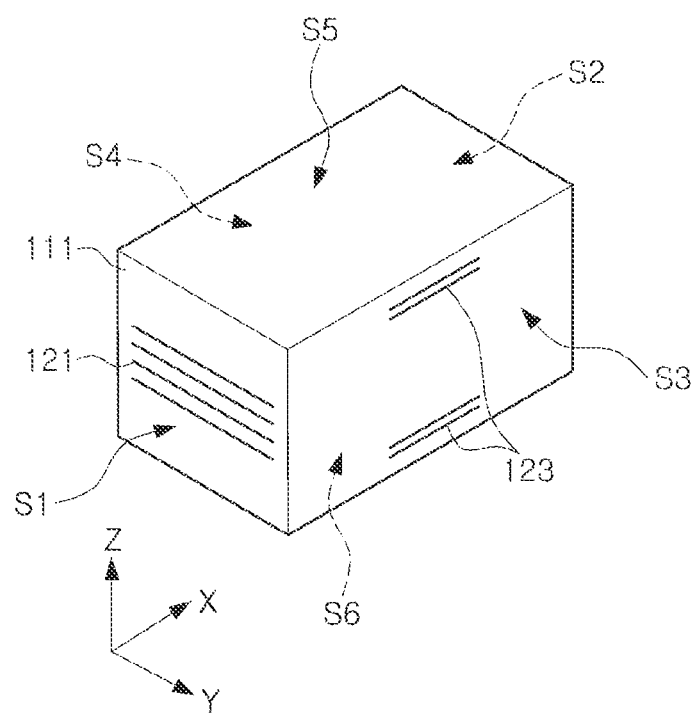
FIG. 2 is a perspective view schematically illustrating the electrode assembly of FIG. 1
Figure 3:
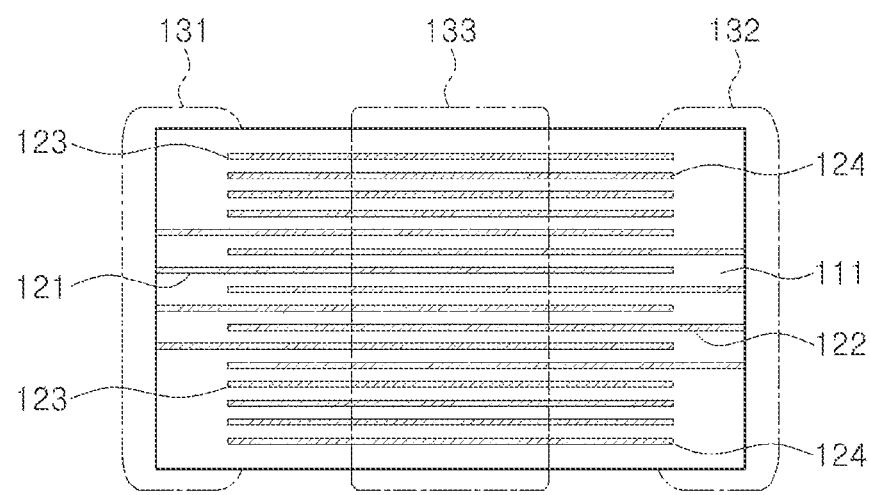
FIG. 3 is a cross-sectional view of FIG. 1.
Figure 3:
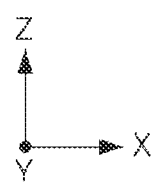
Figure 4A:
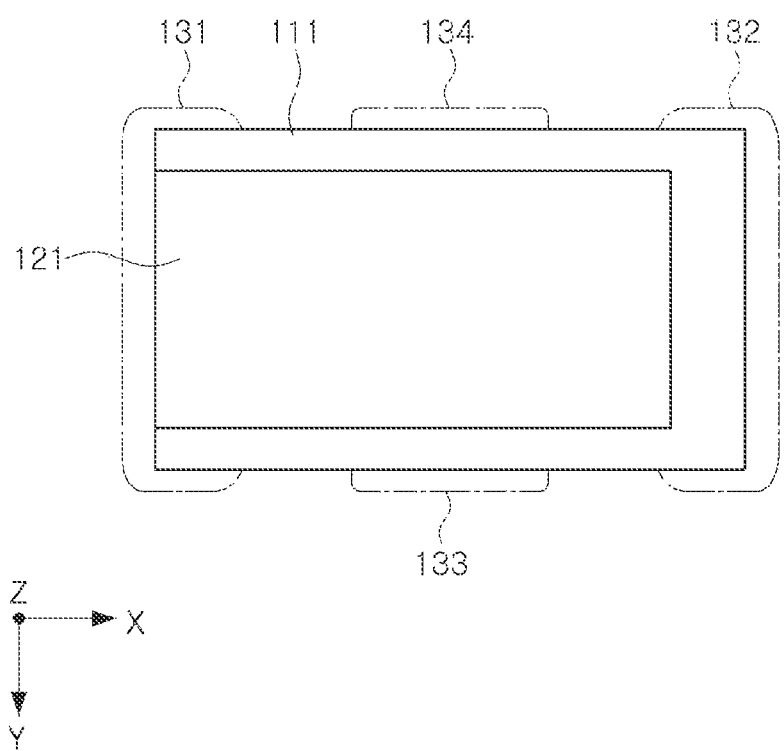
FIGS. 4A and 4B are plan views illustrating the first negative electrode and the first positive electrode of FIG. 1.
Figure 4B:
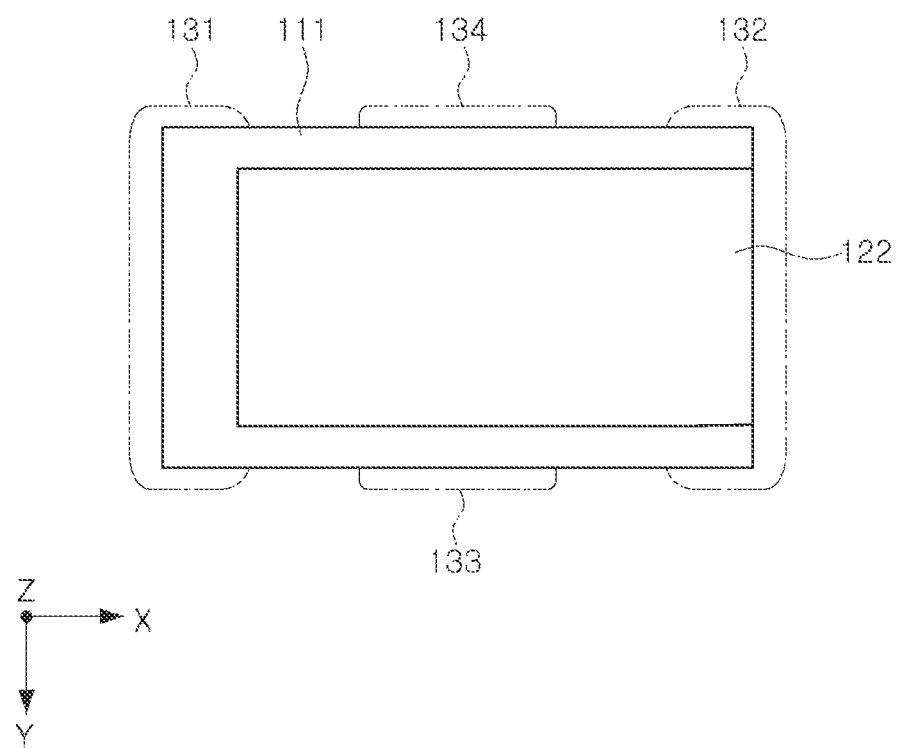
Figure 5A:
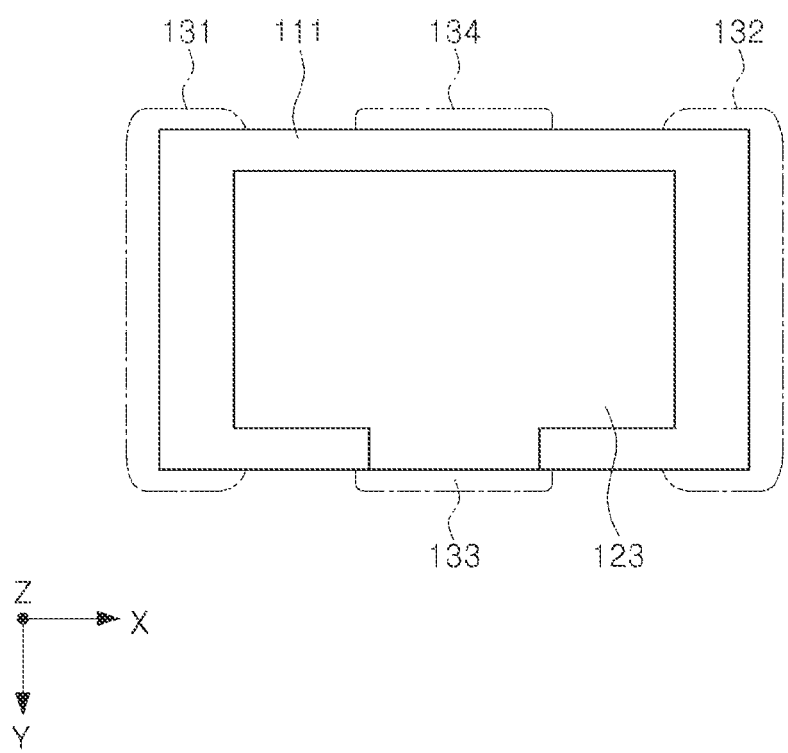
FIGS. 5A and 5B are plan views illustrating the second negative electrode and the second positive electrode of FIG. 1.
Figure 5B:
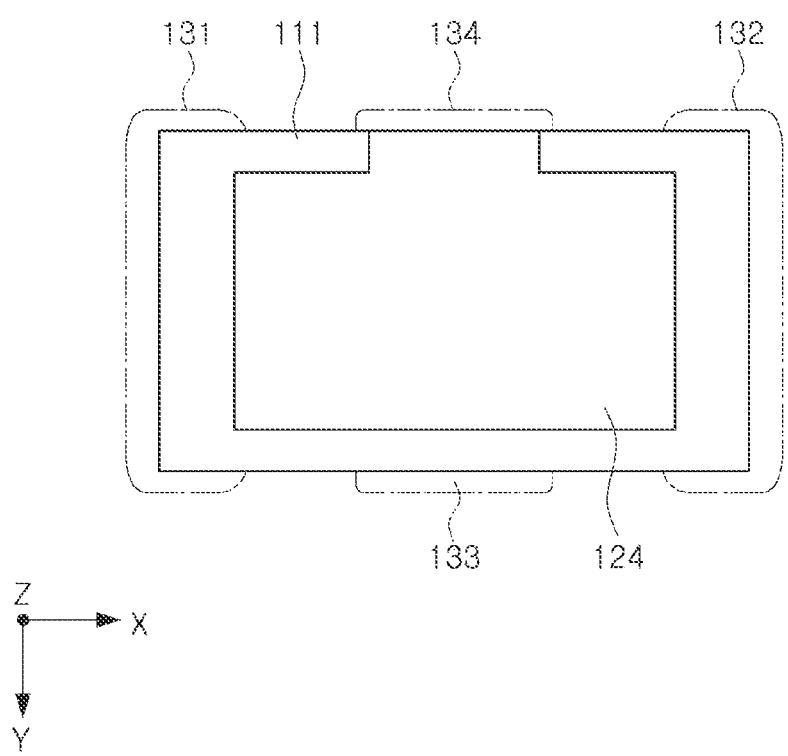

Hereinafter, embodiments of the present disclosure will be described in detail with reference to the accompanying drawings. The present disclosure may, however, be exemplified in many different forms and should not be construed as being limited to the specific embodiments set forth herein. Further, embodiments of the present disclosure may be provided for a more complete description of the present disclosure to those skilled in the art. Accordingly, the shapes and sizes of the elements in the drawings may be exaggerated for clarity of description, and the elements denoted by the same reference numerals in the drawings may be the same elements.

In order to clearly illustrate the present disclosure, portions not related to the description are omitted, and thicknesses are enlarged in order to clearly represent layers and regions, and similar portions having the same functions within the same scope are denoted by similar reference numerals throughout the specification.

In the present specification, expressions such as "have," "may have," "include," "comprise," "may include," or "may comprise" may refer to the presence of corresponding features (e.g., elements such as numbers, functions, actions, or components), and does not exclude the presence of additional features.

In the present specification, expressions such as "A and/or B," "at least one of A and B," or "one or more of A and B" may include all possible combinations of items listed together. For example, "A and/or B," "at least one of A and B," or "one or more of A and B" may refer to (1) including at least one A, (2) including at least one B, or (3) including all at least one A and at least one B.

In the drawings, an X direction may be defined as a first direction, an L direction, or a length direction, a Y direction may be defined as a second direction, a W direction, or a width direction, and a Z direction may be defined as a third direction, a T direction, or a thickness direction.

The present disclosure relates to an all-solid-state battery 100. FIGS. 1 to 5 may be views schematically illustrating an all-solid-state battery 100 according to an embodiment of the present disclosure. Referring to FIGS. 1 to 5, an all-solid-state battery 100 according to the present disclosure may include an electrode assembly 110 including first and second surfaces S1 and S2 opposing in a first direction (an X direction), third and fourth surfaces S3 and S4 opposing in a second direction (a Y direction), and fifth and sixth surfaces S5 and S6 opposing in a third direction (a Z direction), and including a solid electrolyte layer 111, and a first negative electrode 121 and a first positive electrode 122, forming a first battery unit, and a second negative electrode 123 and a second positive electrode 124, forming a second battery unit, the negative and positive electrodes being respectively stacked in the third direction (the Z direction) with the solid electrolyte layer 111 interposed therebetween; a first external electrode 131 connected to the first negative electrode 121 and disposed on the first surface S1 of the electrode assembly 110; a second external electrode 132 connected to the first positive electrode 122 and disposed on the second surface S2 of the electrode assembly 110; a third external electrode 133 connected to the second negative electrode 123 and disposed on the third surface S3 of the electrode assembly 110; and a fourth external electrode 134 connected to the second positive electrode 124 and disposed on the fourth surface S4 of the electrode assembly 110.

In this case, the second battery unit may be disposed to be adjacent to the fifth surface and/or the sixth surface of the electrode assembly, and the first battery unit may be located further inside than the second battery unit in the third direction (the Z direction). The second battery unit formed by the second negative electrode connected to the third external electrode and the second positive electrode connected to the fourth external electrode may be disposed to be adjacent to the fifth surface and/or the sixth surface of the electrode assembly, and may be disposed outwardly to be adjacent to the first battery unit in the third direction. For example, the first battery unit formed by the first negative electrode and the first positive electrode may be disposed to be closer to a central portion of the electrode assembly in the third direction, as compared to the second battery unit.

In conventional all-solid-state batteries, dendrite may be less likely to occur than a battery using a liquid electrolyte, but dendrite tends to occur mainly in a weak portion during rapid charging or overcharging. The weak portion of such an all-solid-state battery may include an end portion of an electrode assembly, an end portion of a negative electrode active material, or the like. An all-solid-state battery according to the present disclosure may be configured to dispose a first battery unit in a central portion of an electrode assembly and dispose a second battery unit in an outward portion of the electrode assembly in the third direction, to form a main capacity portion by the first battery unit, and to function the second battery unit as a protection unit for preventing dendrite growth, short circuit, or the like in a weak portion of the all-solid-state battery according to the present disclosure.

FIGS. 9 to 13 may be views schematically illustrating an all-solid-state battery 200 according to another embodiment of the present disclosure. Referring to FIGS. 9 to 13, an all-solid-state battery 200 of this embodiment may include an electrode assembly 210 including first and second surfaces S1 and S2 opposing in a first direction (an X direction), third and fourth surfaces S3 and S4 opposing in a second direction (a Y direction), and fifth and sixth surfaces S5 and S6 opposing in a third direction (a Z direction), and including a solid electrolyte layer 211, and a third negative electrode 221 and a third positive electrode 222, forming a third battery unit, and a fourth negative electrode 223 and a fourth positive electrode 224, forming a fourth battery unit, the negative and positive electrodes being respectively stacked in the third direction (the Z direction) with the solid electrolyte layer 211 interposed therebetween; a first external electrode 231 connected to the third negative electrode 221 and disposed on the first surface S1 of the electrode assembly 210; a second external electrode 232 connected to the third positive electrode 222 and disposed on the second surface S2 of the electrode assembly 210; a third external electrode 233 connected to the fourth negative electrode 223 and disposed on the third surface S3 of the electrode assembly 210; and a fourth external electrode 234 connected to the fourth positive electrode 224 and disposed on the fourth surface S4 of the electrode assembly 210.

In this case, at least one pair, among a pair of the third negative electrode 221 and the fourth negative electrode 223 and a pair of the third positive electrode 222 and the fourth positive electrode 224, may be disposed on the same layer. In the present specification, the disposing at least one pair, among a pair of the third negative electrode 221 and the fourth negative electrode 223 and a pair of the third positive electrode 222 and the fourth positive electrode 224, on the same layer, may refer to disposing at least one pair, among a pair of the third negative electrode 221 and the fourth negative electrode 223 and a pair of the third positive electrode 222 and the fourth positive electrode 224, together on the same XY plane, in the electrode assembly 210. Referring to FIGS. 9 to 13, the third negative electrode 221 connected to the first external electrode 231 and the third positive electrode 223 connected to the second external electrode 232 may be disposed to oppose each other, and the fourth negative electrode 222 connected to the third external electrode 233 and the fourth positive electrode 224 connected to the fourth external electrode 234 may be disposed to oppose each other. When at least one pair, among a pair of the third negative electrode 221 and the fourth negative electrode 223 and a pair of the third positive electrode 222 and the fourth positive electrode 224 is disposed on the same layer, the fourth battery unit may be disposed in an end portion, which may be a weak portion of the electrode assembly 210, and the third battery unit may be located further inside than the fourth battery unit, to prevent occurrence of dendrites of the third battery unit.

In an all-solid-state battery of a modified form of the above embodiments of the present disclosure, a first battery unit may be located further inside than a third battery unit and a fourth battery unit in the third direction. The all-solid-state battery of this modified form may include an electrode assembly 110 or 210 including first and second surfaces S1 and S2 opposing in a first direction (an X direction), third and fourth surfaces S3 and S4 opposing in a second direction (a Y direction), and fifth and sixth surfaces S5 and S6 opposing in a third direction (a Z direction), and including a solid electrolyte layer 111 or 211, and a first negative electrode 121 and a first positive electrode 122, forming a first battery unit, a third negative electrode 221 and a third positive electrode 222, forming a third battery unit, and a fourth negative electrode 223 and a fourth positive electrode 224, forming a fourth battery unit, the negative and positive electrodes being respectively stacked in the third direction (the Z direction) with the solid electrolyte layer 111 or 211 interposed therebetween; a first external electrode 131 or 231 connected to the first negative electrode 121 and the third negative electrode 221 and disposed on the first surface S1 of the electrode assembly 110 or 210; a second external electrode 132 or 232 connected to the first positive electrode 122 and the third positive electrode 222 and disposed on the second surface S2 of the electrode assembly 110 or 210; a third external electrode 133 or 233 connected to the fourth negative electrode 223 and disposed on the third surface S3 of the electrode assembly 110 or 210; and a fourth external electrode 134 or 234 connected to the fourth positive electrode 224 and disposed on the fourth surface S4 of the electrode assembly 110 or 210.

In the modified form, the first battery unit may be located further inside than the third battery unit and the fourth battery unit, and at least one pair, among a pair of the third negative electrode 221 and the fourth negative electrode 223 and a pair of the third positive electrode 222 and the fourth positive electrode 224 may be disposed on the same layer. In this case, the first battery unit may be disposed in a central portion of the electrode assembly, the third and fourth battery units may be disposed in an outward portion of the electrode assembly in the third direction, and the fourth battery unit may function to suppress occurrence of dendrite in the first battery unit and the third battery unit.

In another modified form of the above embodiments of the present disclosure, a third battery unit and a fourth battery unit may be located further inside than a second battery unit in the third direction. The all-solid-state battery of this modified form may include an electrode assembly 110 or 210 including first and second surfaces S1 and S2 opposing in a first direction (an X direction), third and fourth surfaces S3 and S4 opposing in a second direction (a Y direction), and fifth and sixth surfaces S5 and S6 opposing in a third direction (a Z direction), and including a solid electrolyte layer 111 or 211, and a second negative electrode 123 and a second positive electrode 124, forming a second battery unit, a third negative electrode 221 and a third positive electrode 222, forming a third battery unit, and a fourth negative electrode 223 and a fourth positive electrode 224, forming a fourth battery unit, the negative and positive electrodes being respectively stacked in the third direction (the Z direction) with the solid electrolyte layer 111 or 211 interposed therebetween; a first external electrode 131 or 231 connected to the third negative electrode 221 and disposed on the first surface S1 of the electrode assembly 110 or 210; a second external electrode 132 or 232 connected to the third positive electrode 222 and disposed on the second surface S2 of the electrode assembly 110 or 210; a third external electrode 133 or 233 connected to the second negative electrode 123 and the fourth negative electrode 223 and disposed on the third surface S3 of the electrode assembly 110 or 210; and a fourth external electrode 134 or 234 connected to the second positive electrode 124 and the fourth positive electrode 224 and disposed on the fourth surface S4 of the electrode assembly 110 or 210.

In this modified form, the third battery unit and the fourth battery unit may be located further inside than the second battery unit, and at least one pair, among a pair of the third negative electrode 221 and the fourth negative electrode 223 and a pair of the third positive electrode 222 and the fourth positive electrode 224 may be disposed on the same layer. In this case, the third and fourth battery units may be disposed in a central portion of the electrode assembly in the third direction, and the second battery unit may be disposed in an outward portion of the electrode assembly in the third direction. Therefore, the second battery unit and the fourth battery unit may function to suppress occurrence of dendrite in the third battery unit.

An electrode assembly 110 or 210 of an all-solid-state battery according to the present disclosure may include a solid electrolyte layer 111 or 211, first to fourth negative electrodes 121, 123, 221, and 223, and first to fourth positive electrodes 122, 124, 222, and 224.

The first negative electrode 121, the third negative electrode 221, the first positive electrode 122, and/or the third positive electrode 222 may be stacked to have respective cross-sections thereof exposed from both end portions of the electrode assembly 110 or 210 in the first direction (the X direction), respectively. Specifically, the first negative electrode 121 and/or the third negative electrode 221 may be exposed in a direction facing the first surface S1 of the electrode assembly 110 or 210, and the first positive electrode 122 and/or the third positive electrode 222 may be exposed in a direction facing the second surface S2.

In addition, the second negative electrode 123, the fourth negative electrode 223, the second positive electrode 124 and/or the fourth positive electrode 224 may be stacked to have respective cross-sections thereof exposed from both end portions of the electrode assembly 110 or 210 in the second direction (the Y direction), respectively. Specifically, the second negative electrode 123 and/or the fourth negative electrode 223 may be exposed in a direction facing the third surface S3 of the electrode assembly 110 or 210, and the second positive electrode 124 and/or the fourth positive electrode 224 may be exposed in a direction facing the fourth surface S4.

Such a configuration may have a structure in which the first negative electrode and the first positive electrode, the second negative electrode and the second positive electrode, the third negative electrode and the third positive electrode, and/or the fourth negative electrode and the fourth positive electrode form one (1) battery unit. For example, in an all-solid-state battery according to the present disclosure, a plurality of batteries may be included in one (1) structure.

A negative electrode of an all-solid-state battery according to the present disclosure may include a negative electrode current collector and a negative electrode active material.

A negative electrode included in an all-solid-state battery according to the present disclosure may include a negative electrode active material commonly used. As the negative electrode active material, a carbon-based material, silicon, silicon oxide, a silicon-based alloy, a silicon-carbon-based material composite, tin, a tin-based alloy, a tin-carbon composite, a metal oxide, or a combination thereof may be used, and a lithium metal and/or a lithium metal alloy may be included.

The lithium metal alloy may include lithium, and a metal/metalloid alloyable with lithium. Examples of the metal/metalloid alloyable with lithium may be Si, Sn, Al, Ge, Pb, Bi, Sb, a Si—Y alloy (where Y is an alkaline metal, an alkaline earth metal, Group 13 to Group 16 elements, a transition metal, or a rare earth element, except for Si), a Sn—Y alloy (where Y is an alkaline metal, an alkaline earth metal, Group 13 to Group 16 elements, a transition metal such as a lithium titanium oxide ($Li_4Ti_5O_{12}$), or the like, or a rare earth element, except for Sn), $MnO_x$ ($0<x\leq2$), or the like. Examples of Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

In addition, an oxide of the metal/metalloid alloyable with lithium may be lithium titanium oxide, vanadium oxide, lithium vanadium oxide, $SnO_2$, $SiO_x$ ($0<x<2$), or the like. For example, the negative electrode active material may include one or more elements selected from the group consisting of Group 13 to Group 16 elements of the Periodic Table of Elements. For example, the negative electrode active material may include one or more elements selected from the group consisting of Si, Ge, and Sn.

The carbon-based material may be crystalline carbon, amorphous carbon, or a mixture thereof. The crystalline carbon may be graphite such as amorphous, plate-like, flake, spherical, or fibrous natural graphite or artificial graphite. In addition, the amorphous carbon may be soft carbon (low temperature calcined carbon), hard carbon, mesophase pitch carbide, calcined coke, graphene, carbon black, fullerene soot, carbon nanotubes, carbon fibers, and the like, but is not limited thereto.

The silicon may be selected from the group consisting of Si, $SiO_x$ ($0<x<2$, for example 0.5 to 1.5), Sn, $SnO_2$, or a silicon-containing metal alloy, and mixtures thereof. The silicon-containing metal alloy may include, for example, silicon, and one or more of Al, Sn, Ag, Fe, Bi, Mg, Zn, in, Ge, Pb, and Ti.

As the negative electrode current collector, a porous body such as a mesh, mesh-like, or the like may be used, and a porous metal plate such as stainless steel, nickel, copper, aluminum, or the like may be used, but is not limited thereto. In addition, the negative electrode current collector may be coated with an oxidation resistant metal or alloy film to prevent oxidation.

The negative electrode of the all-solid-state battery according to the present disclosure may optionally contain a conductive agent and a binder. The conductive agent is not particularly limited as long as it has conductivity without causing a chemical change in the all-solid-state battery of the present disclosure. For example, graphite such as natural graphite, artificial graphite, or the like; carbon-based materials, such as carbon black, acetylene black, Ketjen black, channel black, furnace black, lamp black, summer black, or the like; conductive fibers, such as carbon fibers, metal fibers, or the like; carbon fluoride; a metal powder, such as aluminum, nickel powder, or the like; conductive whiskers, such as zinc oxide, potassium titanate, or the like; a conductive metal oxide, such as a titanium oxide, or the like;

and a conductive material, such as a polyphenylene derivative, or the like, may be used.

The binder may be used to improve bonding strength between the active material and the conductive agent, or the like. The binder may be polyvinylidene fluoride, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, ethylene-propylene-diene terpolymer (EPDM), sulfonated EPDM, styrene butadiene rubber, fluorine rubber, various copolymers, or the like, but is not limited thereto.

The negative electrode applied to the all-solid-state battery of the present disclosure may be produced by directly coating and drying a composition containing a negative electrode active material on a negative electrode current collector containing a metal such as copper, or the like. Alternatively, a composition containing a negative electrode active material may be cast on a separate support and then cured to prepare a negative electrode. In this case, a separate negative electrode current collector may not be included.

A positive electrode of an all-solid-state battery according to the present disclosure may include a positive electrode current collector and a positive electrode active material.

In an example of the present disclosure, the positive electrode active material included in the positive electrode is not particularly limited as long as it may secure sufficient capacity. For example, the positive electrode active material may include one or more selected from the group consisting of lithium cobalt oxide, lithium nickel cobalt manganese oxide, lithium nickel cobalt aluminum oxide, lithium iron phosphate, and lithium manganese oxide, but is not limited thereto. All positive electrode active materials available in the related art may be used.

The positive electrode active material may be, for example, a compound represented by the following formula: $Li_aA_{1-b}M_bD_2$ (where $0.90 \leq a \leq 1.8$, $0 \leq b \leq 0.5$); $Li_aE_{1-b}MbO_{2-c}D_c$ (where $0.90 \leq a \leq 1.8$, $0 \leq b \leq 0.5$, $0 \leq c \leq 0.05$); $LiE_{2-b}M_bO_{4-c}D_c$ (where $0 \leq c \leq 0.5$, $0 \leq c \leq 0.05$); $Li_aNi_{1-b-c}Co_bM_cD_\alpha$ (where $0.90 \leq a \leq 1.8$, $0 \leq b \leq 0.5$, $0 \leq c \leq 0.05$, $0 \leq \alpha \leq 2$); $Li_aNi_{1-b-c}Co_bM_cO_{2-\alpha}X_\alpha$ (where $0.90 \leq a \leq 1.8$, $0 \leq b \leq 0.5$, $0 \leq c \leq 0.05$, $0 < \alpha < 2$); $Li_aNi_{1-b-c}Co_bM_cO_{2-\alpha}X_2$ (where $0.90 \leq a \leq 1.8$, $0 \leq b \leq 0.5$, $0 \leq c \leq 0.05$, $0 < \alpha < 2$); $Li_aNi_{1-b-c}Mn_bM_cD_\alpha$ (where $0.90 \leq a \leq 1.8$, $0 \leq b \leq 0.5$, $0 \leq c \leq 0.05$, $0 < \alpha \leq 2$); $Li_aNi_{1-b-c}Mn_bM_cO_{2-\alpha}X_\alpha$ (where $0.90 \leq a \leq 1.8$, $0 \leq b \leq 0.5$, $0 \leq c \leq 0.05$, $0 < \alpha < 2$); $Li_aNi_{1-b-c}Mn_bM_cO_{2-\alpha}X_2$ (where $0.90 \leq a \leq 1.8$, $0 \leq b \leq 0.5$, $0 \leq c \leq 0.05$, $0 < \alpha < 2$); $Li_aNi_bE_cG_dO_2$ (where $0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ (where $0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ (where $0.90 \leq a \leq 1.8$, $0.001 \leq b \leq 0.1$); $Li_aCoG_bO_2$ (where $0.90 \leq a \leq 1.8$, $0.001 \leq b \leq 0.1$); $Li_aMnG_bO_2$ (where $0.90 \leq a \leq 1.8$, $0.0011 \leq b \leq 0.1$); $Li_aMn_2G_bO_4$ (where $0.90 \leq a \leq 1.8$, $0.001 \leq b \leq 0.1$); $QO_2$; $QS_2$; $LiQS_2$; $V_2O_5$; $LiV_2O_2$; $LiRO_2$; $LiNiVO_4$; $Li_{(3-f)}J_2(PO_4)_3$ (where $0 \leq f \leq 2$); $Li_{(3-f)}Fe_e(PO_4)_3$ (where $0 \leq f \leq 2$); and $LiFePO_4$. In the above formula, A may be Ni, Co, or Mn; M may be Al, Ni, Co, Mn, Cr, Fe, Mg, Sr, V, or a rare-earth element; D may be O, F, S, or P; E may be Co or Mn; X may be F, S, or P; G may be Al, Cr, Mn, Fe, Mg, La, Ce, Sr, or V; Q may be Ti, Mo or Mn; R may be Cr, V, Fe, Sc, or Y; J may be V, Cr, Mn, Co, Ni, or Cu.

The positive electrode active material may also be $LiCoO_2$, $LiMn_xO_{2x}$ (where $x=1$ or $2$), $LiNi_{1-x}Mn_xO_{2x}$, (where $0 < x < 1$), $LiNi_{1-x-y}Co_xMn_yO_2$ (where $0 \leq x \leq 0.5$, $0 \leq y \leq 0.5$), $LiFePO_4$, $TiS_2$, $FeS_2$, $TiS_3$, or $FeS_3$, but is not limited thereto.

The positive electrode current collector of the all-solid-state battery according to the present disclosure may use the same configuration as the negative electrode current collector. As the positive electrode current collector, a porous body such as a mesh, mesh-like element, or the like may be used, and a porous metal plate such as stainless steel, nickel, copper, aluminum, or the like may be used, but is not limited thereto. In addition, the positive electrode current collector may be coated with an oxidation resistant metal or alloy film to prevent oxidation.

The positive electrode may be manufactured according to almost the same method, except that the positive electrode active material is used instead of the negative electrode active material in the above-described process of manufacturing the negative electrode.

In the all-solid-state battery according to the present disclosure, a solid electrolyte layer may be disposed between the negative electrode and the positive electrode, respectively.

In an embodiment of the present disclosure, the solid electrolyte layer according to the present disclosure may be one or more selected from the group consisting of a garnet-type solid electrolyte layer, a sodium super ionic conductor (NASICON)-type solid electrolyte layer, a lithium super ionic conductor (LISICON)-type solid electrolyte layer, a perovskite-type solid electrolyte layer, and a lithium phosphorus oxynitride (LiPON)-type solid electrolyte layer.

The garnet-type solid electrolyte layer may refer to a layer including lithium-lanthanum zirconium oxide (LLZO) represented by $Li_aLa_bZr_cO_{12}$ such as $Li_7La_3Zr_2O_{12}$, or the like, and the NASICON-type solid electrolyte layer may refer to a layer including lithium-aluminum-titanium-phosphate (LATP) represented by $Li_{1+x}Al_xTi_{2-x}(PO_4)_3$ ($0<x<1$) in which Ti has been introduced into $Li_{1+x}Al_xM_{2-x}(PO_4)_3$ (LAMP) type compound (where $0<x<2$, M=Zr, Ti, or Ge), lithium-aluminum-germanium-phosphate (LAGP) represented by $Li_{1+x}Al_xGe_{2-x}(PO_4)_3$ ($0<x<1$) such as $Li_{1.3}Al_{0.3}Ti_{1.7}(PO_4)_3$ into which excess lithium has been introduced; and/or lithium-zirconium-phosphate (LZP) represented by $LiZr_2(PO_4)_3$.

In addition, the LISICON-type solid electrolyte layer may refer to a layer including solid solution oxides including $Li_4Zn(GeO_4)$ $Li_{10}GeP_2O_{12}$ (LGPO), $Li_{3.5}Si_{0.5}P_{0.5}O_4$, $Li_{10.42}Si(Ge)_{1.5}P_{1.5}Cl_{0.08}O_{11.92}$, or the like, represented by $xLi_3AO_4-(1-x)Li_4BO_4$ (where A=P, As, V, or the like, and B=Si, Ge, Ti, or the like), and solid solution sulfides including $Li_2S-P_2S_5$, $Li_2S-SiS_2$, $Li_2S-SiS_2-P_2S_5$, $Li_2S-GeS_2$, or the like, represented by $Li_{4-x}M_{1-y}M'_y'S_4$ (where M=Si or Ge, and M'=P, Al, Zn, or Ga).

The perovskite-type solid electrolyte layer may refer to a layer including lithium-lanthanum-titanate (LLTO) represented by $Li_{3x}La_{2/3-x}\square_{1/3-2x}TiO_3$ ($0<x<0.16$, $\square$=vacancies) such as $Li_{1/8}La_{5/8}TiO_3$, or the like, and the LiPON-type solid electrolyte layer may refer to a layer including a nitride such as lithium-phosphorous-oxynitride such as $Li_{2.8}PO_{3.3}N_{0.46}$, or the like.

In an example, at least one connection electrode to connect between the first external electrode 131 or 231 and the third external electrode 133 or 233 and/or between the second external electrode 132 or 232 and the fourth external electrode 134 or 234 may be included. The connection electrode may connect between the first external electrode 131 or 231 and the third external electrode 133 or 233, may connect between the second external electrode 132 or 232 and the fourth external electrode 134 or 234, or may connect between the first external electrode 131 or 231 and the third external electrode 133 or 233 and between the second external electrode 132 or 232 and the fourth external electrode 134 or 234. For example, the connection electrode of the all-solid-state battery according to the present disclosure may be lead out from the first surface S1 and the third surface S3 of the electrode assembly 110 or 210, may be lead out from the second surface S2 and the fourth surface S4 of the electrode assembly 110 or 210, or may be lead out from the first surface S1 and the third surface S3 of the electrode assembly 110 or 210 and from the second surface S2 and the fourth surface S4 of the electrode assembly 110 or 210.

Figure 6:
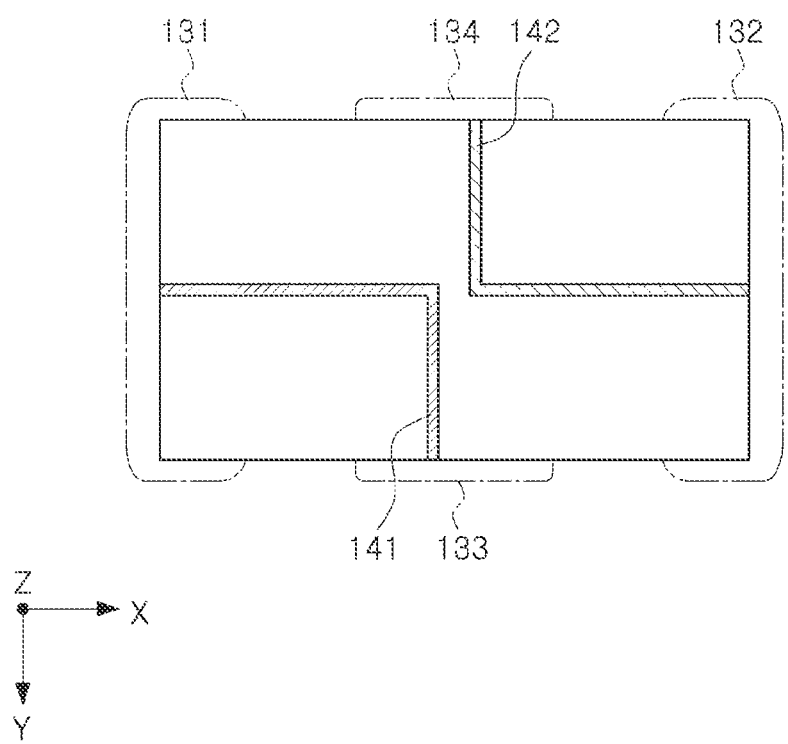
FIGS. 6 to 8 are plan views illustrating a modified form of a connection electrode of the present disclosure.
Figure 7:
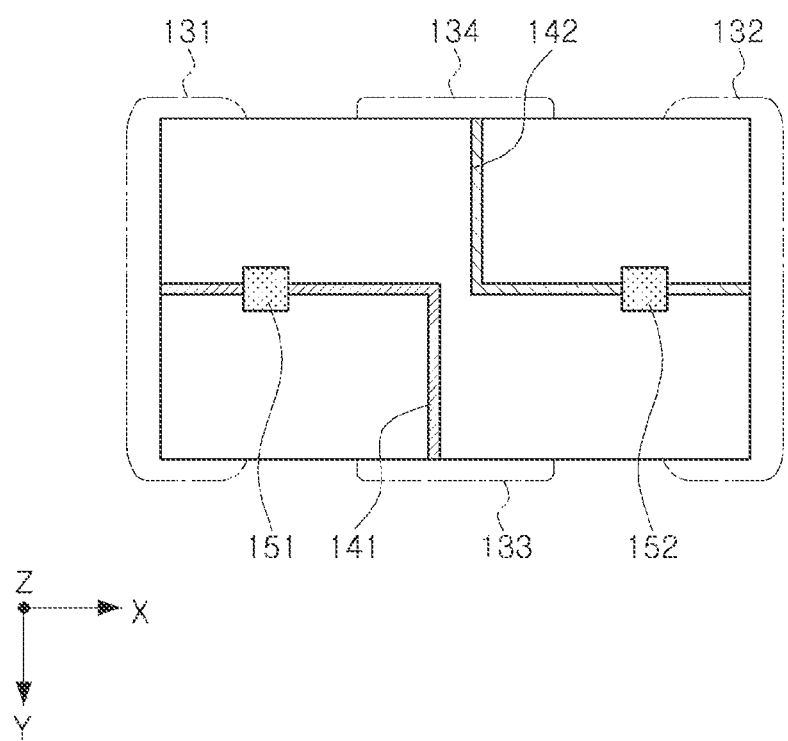
Figure 8:
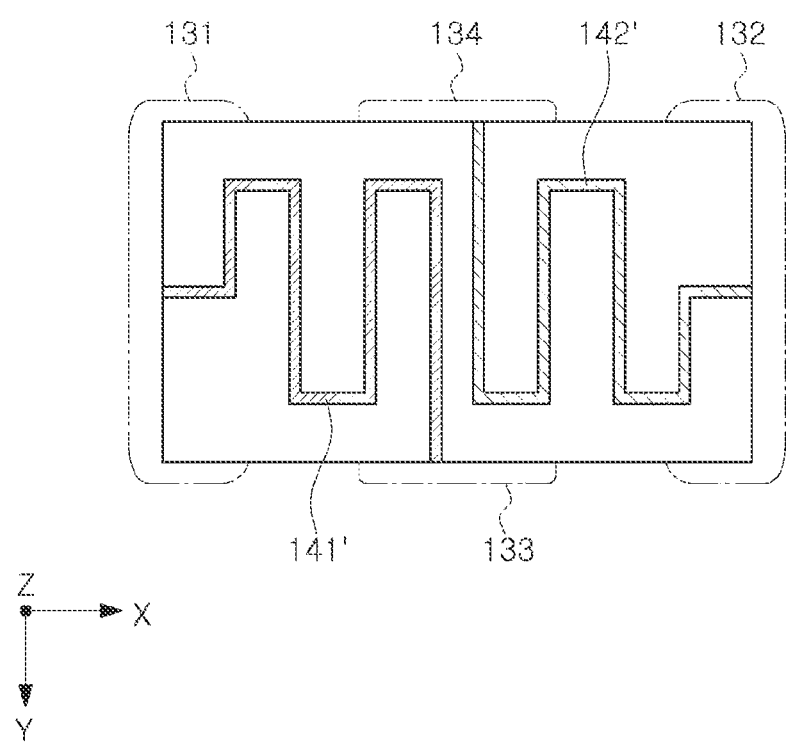
Figure 9:
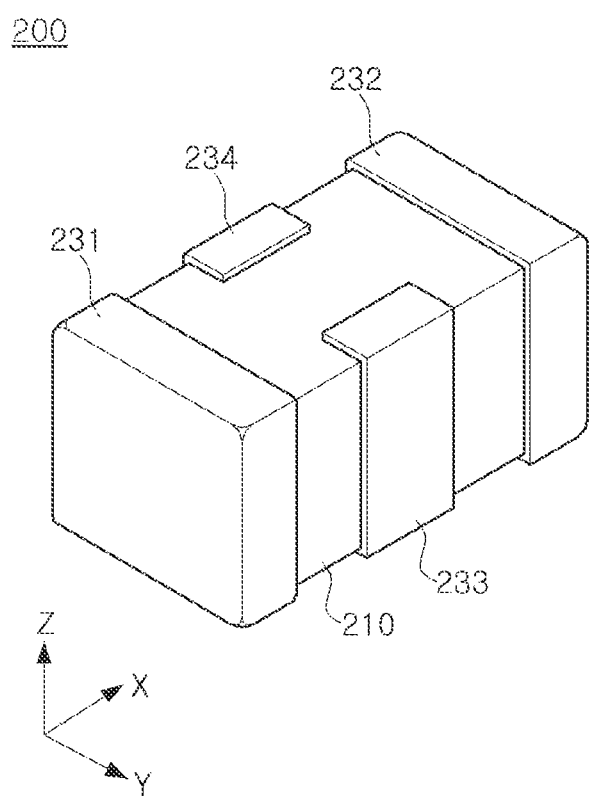
FIG. 9 is a perspective view schematically illustrating an all-solid-state battery according to another embodiment of the present disclosure.
Figure 10:
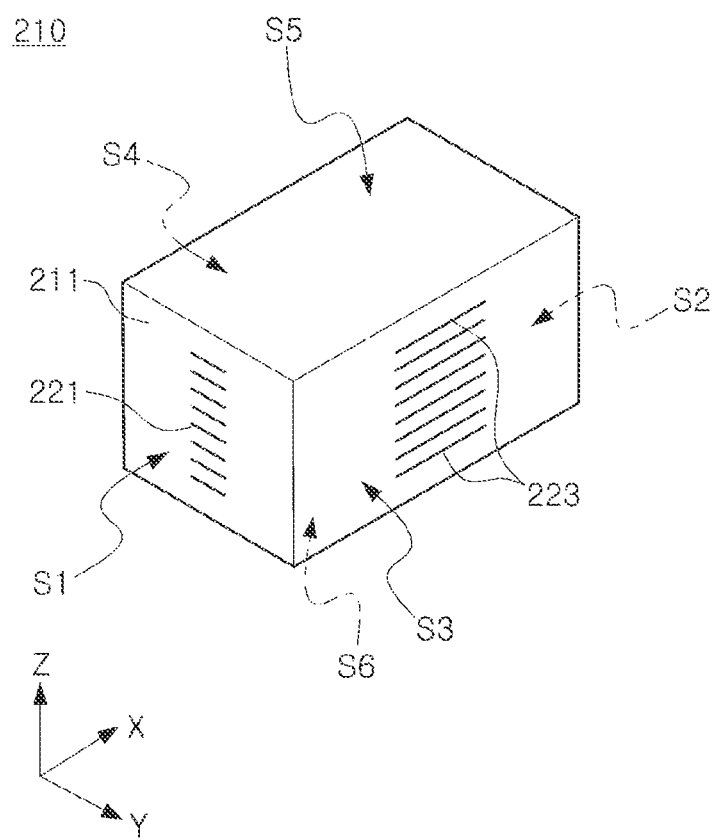
FIG. 10 is a perspective view schematically illustrating the electrode assembly of FIG. 9
Figure 11:
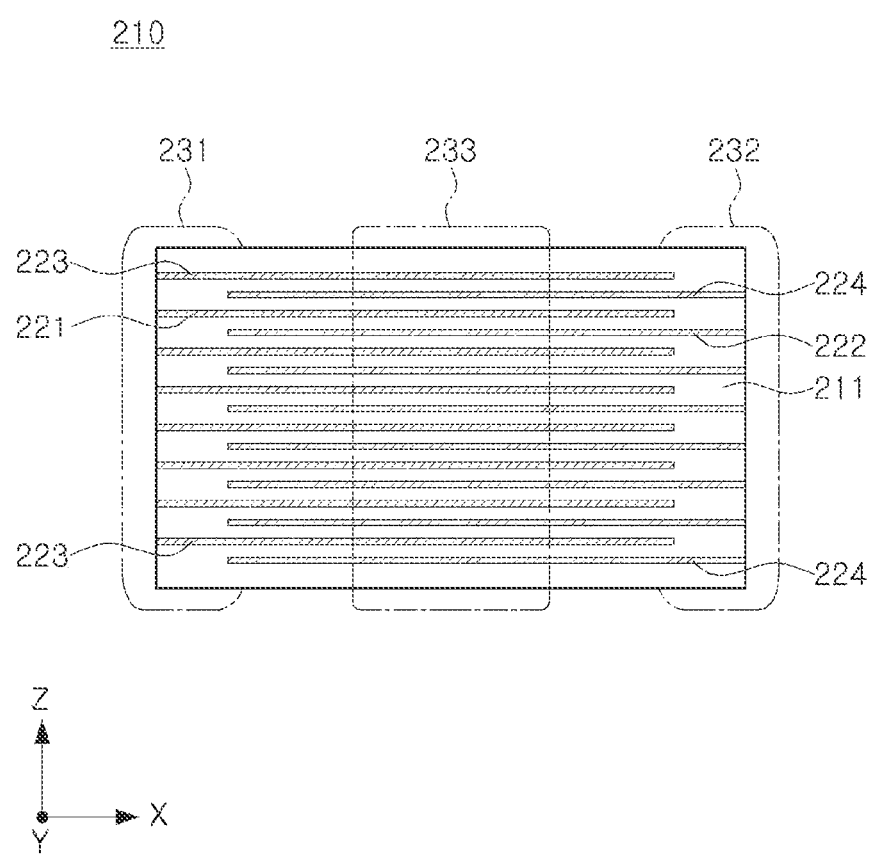
FIG. 11 is a cross-sectional view of FIG. 9.

FIGS. 6 to 8 may be cross-sectional views illustrating connection electrodes according to the present disclosure. The connection electrodes of FIGS. 6 to 8 may be equally applied to other embodiments and/or modified forms of the present disclosure. Referring to FIGS. 6 to 8, a connection electrode may include a first connection electrode 141 connecting a first external electrode 131 to a third external electrode 133, may include a second connection electrode 142 connecting a second external electrode 132 to a fourth external electrode 134, or may include the first connection electrode 141 and the second connection electrode 142. The first external electrode 131 and the third external electrode 133 may be connected by the first connection electrode 141, and a battery unit connected to the first external electrode 131 and a battery unit connected to the third external electrode 133 may be connected. In addition, the second external electrode 132 and the fourth external electrode 134 may be connected by the second connection electrode 142, and a battery unit connected to the second external electrode 132 and a battery unit connected to the fourth external electrode 134 may be connected. For example, the first connection electrode 141 and/or the second connection electrode 142 may perform a function of connecting respective battery units of the all-solid-state battery 100 according to the present disclosure.

When the first connection electrode 141 and/or the second connection electrode 142 are disposed to connect a plurality of battery units as in this example, a battery unit connected to the third external electrode and/or the fourth external electrode may function as a bypass path for current input/output to other battery units. Because of this, the all-solid-state battery according to the present disclosure may reduce possibility of occurrence of overcharge, short circuit, or the like, and even when the overcharge or the short circuit occurs, it may prevent damage to the battery by mitigating and/or blocking current flowing back.

The all-solid-state battery according to the present disclosure may include one or more connection electrodes, and may include one or more layers. The number of connection electrodes may be adjusted as necessary, and an upper limit thereof is not particularly limited, but may be, for example, 100 or less.

A position of the connection electrode is not particularly limited. The connection electrode may be disposed between each of the battery units, or may be disposed in one or more of the first to fourth battery units. Alternatively, the connection electrode may be disposed in a further outward direction of the electrode assembly in the third direction, as compared to an outermost battery unit among the battery units, but is not limited thereto. In addition, when the connection electrode is disposed in at least one of the first to fourth battery units, the connection electrode may be disposed on the same layer as the first to fourth negative electrodes and/or the first to fourth positive electrodes, but is not limited thereto.

A material forming the connection electrode is not particularly limited, and may be formed using, for example, a conductive paste containing at least one conductive metal of silver (Ag), palladium (Pd), gold (Au), platinum (Pt), nickel (Ni), copper (Cu), tin (Sn), tungsten (W), titanium (Ti), or an alloy thereof.

In an embodiment of the present disclosure, the electrode assembly of the all-solid-state battery may further include a resistance connection layer. At least one resistor may be disposed on the resistance connection layer, and may function to control a charge/discharge rate of the all-solid-state battery according to the present disclosure. At least one resistor may be disposed between the first external electrode and the third external electrode and/or between the second external electrode and the fourth external electrode. The resistor may be a variable resistor, but is not limited thereto.

In an embodiment of the present disclosure, the connection electrode of the all-solid-state battery according to the present disclosure may be disposed on the resistance connection layer. As described above, the connection electrode may be an electrode for connecting the first external electrode and the third external electrode and/or may be an electrode for connecting the second external electrode and the fourth external electrode, and may not have a separate capacity. Therefore, the connection electrode may be disposed on the resistance connection layer, to efficiently arrange an internal space.

In an example, an all-solid-state battery according to the present disclosure may include one or more resistors connected in series with a connection electrode. FIG. 7 may be a plan view schematically illustrating an all-solid-state battery having a structure in which a resistor is connected to a connection electrode. Referring to FIG. 7, connection electrodes 141 and 142 of an all-solid-state battery according to the present disclosure may be connected in series with one or more resistors 151 and 152. The resistor may be the same as the resistor of the aforementioned resistance connection layer. In this case, the connection electrode may directly function as a resistance connection layer.

In another example, a connection electrode of an all-solid-state battery according to the present disclosure may include two or more bent portions. FIG. 8 may be a plan view schematically illustrating an all-solid-state battery in which connection electrodes including two or more bent portions are disposed. Referring to FIG. 8, connection electrodes 141' and 142' of this embodiment may be arranged to have two or more bent portions between the first and third external electrodes and/or between the second and fourth external electrodes. A sub-negative electrode 123 and/or a sub-positive electrode 124 of this embodiment, including the bent portions, may have a long current path. Therefore, a connection electrode may directly function as a resistor, without disposing a separate resistor.

In an example, two or more of the first to fourth battery units of the all-solid-state battery according to the present disclosure may be connected in parallel with each other. The connecting the battery units in parallel may refer that the positive electrodes may be connected to each other and/or the negative electrodes may be connected to each other, in each of the battery units, and may refer that the battery units are not connected in series with each other. The first battery unit, the second battery unit, the third battery unit, and/or the fourth battery unit may constitute one (1) battery, respectively, and may be connected to one (1) battery by the aforementioned connection electrode. When a plurality of battery units of the all-solid-state battery according to the present disclosure are connected in parallel with each other, each of the battery units may function as a bypass route for current to each other, to prevent damage to the battery.

In an example of the present disclosure, the first to fourth battery units of the all-solid-state battery may have a structure in which two or more negative electrodes and two or more positive electrodes are stacked, respectively. The battery units may be disposed such that two or more negative electrodes and two or more positive electrodes oppose each other with a solid electrolyte layer interposed therebetween. Each of the battery units may include, for example, two or more negative electrodes and two or more positive electrodes. The description of the negative electrode, the positive electrode, and the solid electrolyte layer may be the same as described above, and thus will be omitted. When the first to fourth battery units of the all-solid-state battery have a structure in which two or more negative electrodes and two or more positive electrodes are stacked, respectively, as in this example, capacity of the battery may be maximized, and a fast charging and discharging rate of the battery may be realized.

According to an embodiment of the present disclosure, at least one pair of the first to fourth battery units of the all-solid-state battery of the present disclosure may have different charging rates. As described above, the all-solid-state battery according to the present disclosure may include at least two or more of the first to fourth battery units, and a structure in which a connection electrode is disposed therebetween or a resistance connection layer is disposed therebetween. In the all-solid-state battery of this embodiment, at least one pair of the first to fourth battery units may have different charging rates to prevent overcharging of the battery and have excellent electrical performance.

Figure 18:
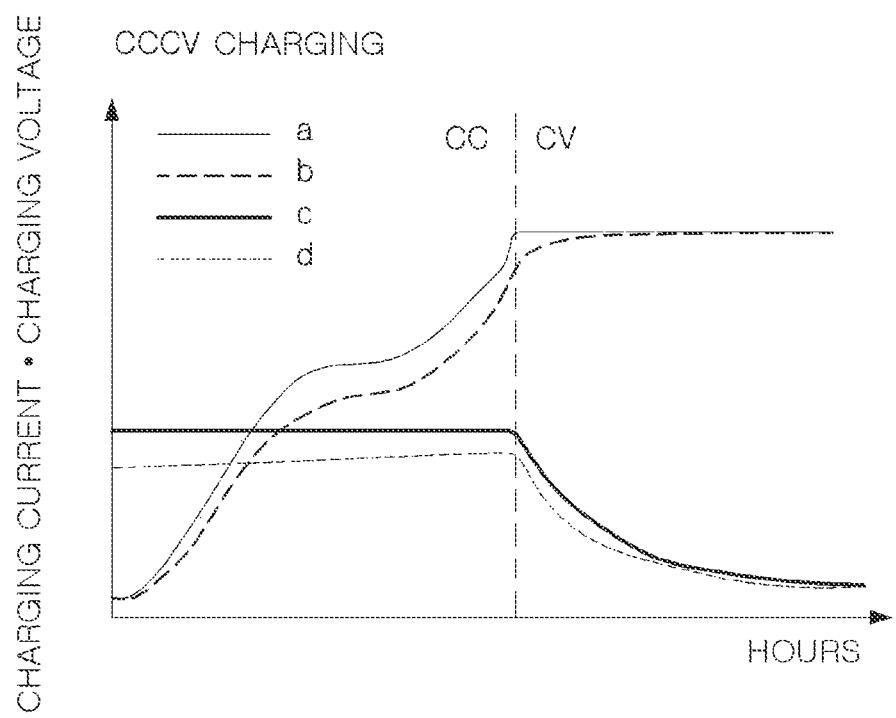
FIGS. 18 and 19 are views illustrating results of constant current mode-constant voltage mode charging and constant current mode charging in an example according to the present disclosure.
Figure 19:
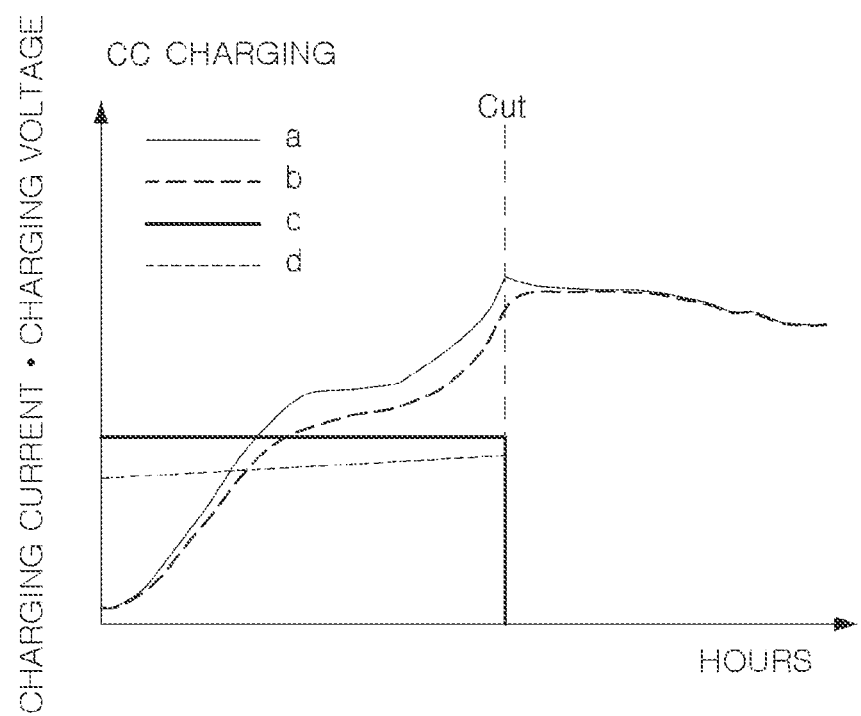

FIGS. 18 and 19 are views illustrating results of constant current mode-constant voltage mode charging and constant current mode charging for an all-solid-state battery according to an embodiment of the present disclosure, respectively. Referring to FIGS. 18 and 19, a is a voltage of a first external electrode, b is a voltage of a third external electrode, c is a current of the first external electrode, and d is a current of the third external electrode. Referring to FIGS. 18 and 19, in the all-solid-state battery of the present disclosure, it can be seen that the voltage and current of the third external electrode are slower than that of the first external electrode. As described above, even when an overcharge occurs in one (1) battery unit, a charging rate between different battery units may be adjusted to use the other battery unit as a buffer, to prevent damage to the battery.

Figure 12:
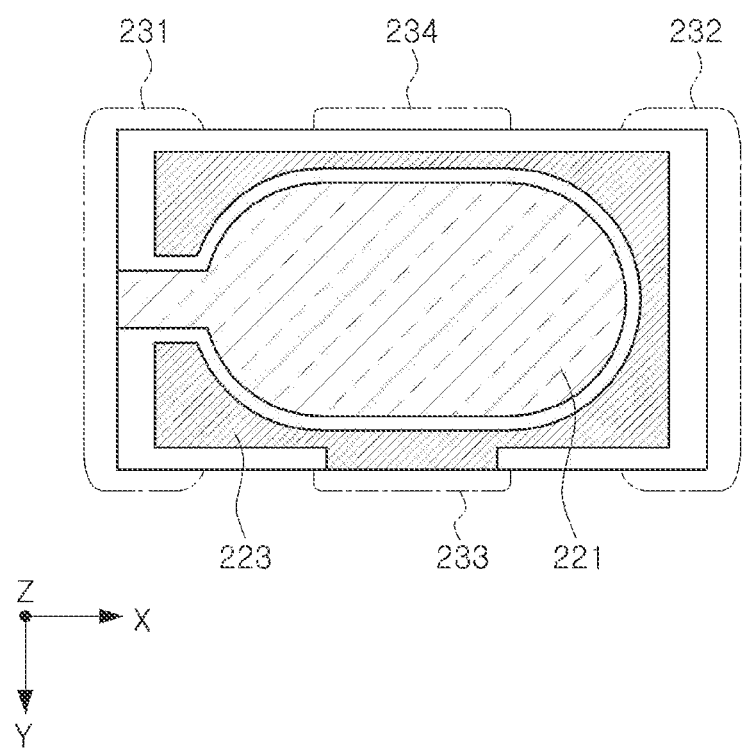
FIGS. 12 and 13 are plan views illustrating a negative electrode, a positive electrode, a sub-negative electrode, and a sub-positive electrode, according to an embodiment of the present disclosure.
Figure 13:
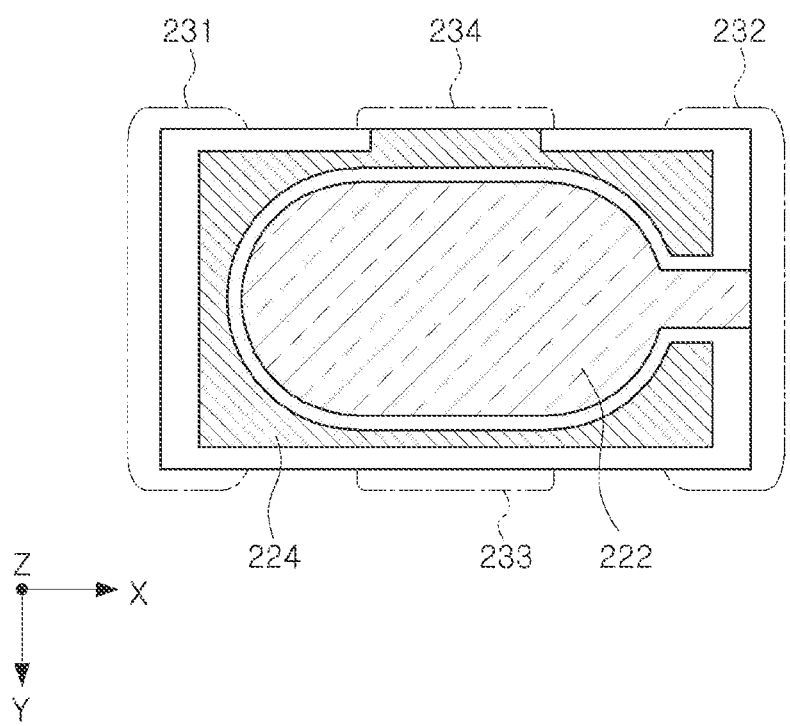

According to an example of the present disclosure, a fourth negative electrode 223 and a fourth positive electrode 224 of the present disclosure may be disposed to surround a third negative electrode 221 and a third positive electrode 222 in three directions, respectively. The disposing the fourth negative electrode 223 and/or the fourth positive electrode 224 to surround the third negative electrode 221 and/or the third positive electrode 222 in three directions may refer to a structure in which the fourth negative electrode 223 and/or the fourth positive electrode 224 may be disposed in outward portions of the third negative electrode 221 and/or the third positive electrode 222 in the first direction (the X direction) and the second direction (the Y direction). Specifically, the fourth negative electrode 223 may be disposed to surround in three directions, except for a direction in which the third negative electrode 221 is connected to the first external electrode 231, among two direction of the first direction (the X direction) and two direction of the second direction (the Y direction). In addition, the fourth positive electrode 224 may be disposed to surround in three directions, except for a direction in which the third positive electrode 222 is connected to the second external electrode 232, among two direction of the first direction (the X direction) and two direction of the second direction (the Y direction). Referring to FIGS. 12 and 13, the third negative electrode 221 may be lead out in one direction of the first direction (the X direction) to be connected to the first external electrode 231, and the fourth negative electrode 223 may be disposed to surround the third negative electrode 221 in the other direction of the first direction (the X direction) and two direction of the second direction (the Y direction). In addition, the third positive electrode 222 may be lead out in one direction of the first direction (the X direction) to be connected to the second external electrode 232, and the fourth positive electrode 224 may be disposed to surround the third positive electrode 222 in the other direction of the first direction (the X direction) and in two directions of the second direction (the Y direction). As described above, the fourth negative electrode 223 and/or the fourth positive electrode 224 may be disposed to surround the third negative electrode 221 and/or the third positive electrode 222 in three directions, to minimize occurrence of dendrites in end portions of the third negative electrode and/or the third positive electrode.

In an embodiment of the present disclosure, a third negative electrode 221 and a third positive electrode 222 of an all-solid-state battery 200 according to the present disclosure may have a round shape, respectively. In the present specification, a shape of the electrode may refer to a shape on an X-Y plane, and may refer to a shape, when viewed from the third direction. Referring to FIGS. 12 and 13, a third negative electrode 221 and a third positive electrode 222 of an all-solid-state battery 200 of this embodiment may have a round shape, when viewed from the third direction (the Z direction).

Figure 14:
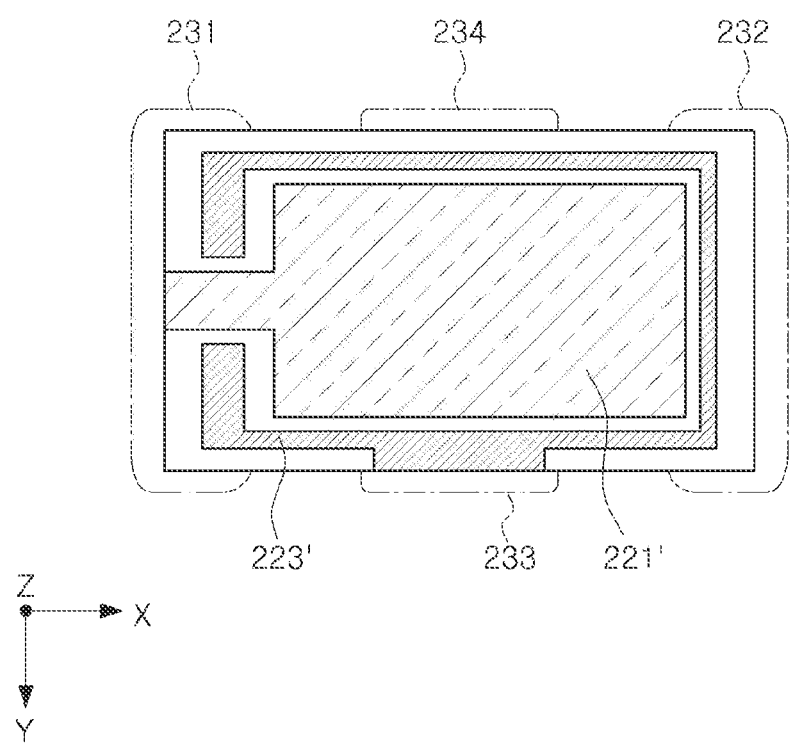
FIGS. 14 and 15 are plan views illustrating a negative electrode, a positive electrode, a sub-negative electrode, and a sub-positive electrode, according to an embodiment of the present disclosure.
Figure 15:
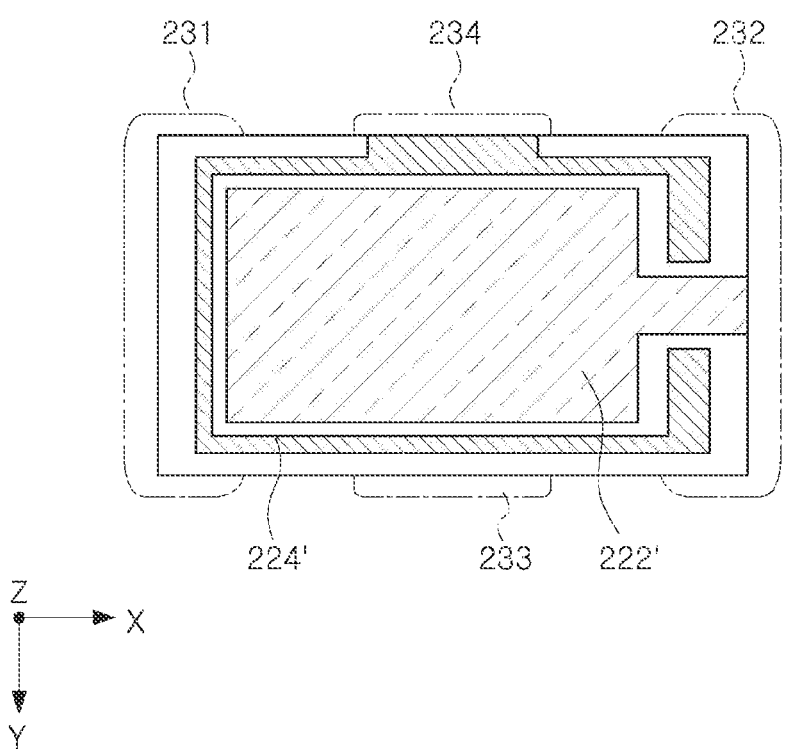
Figure 16:
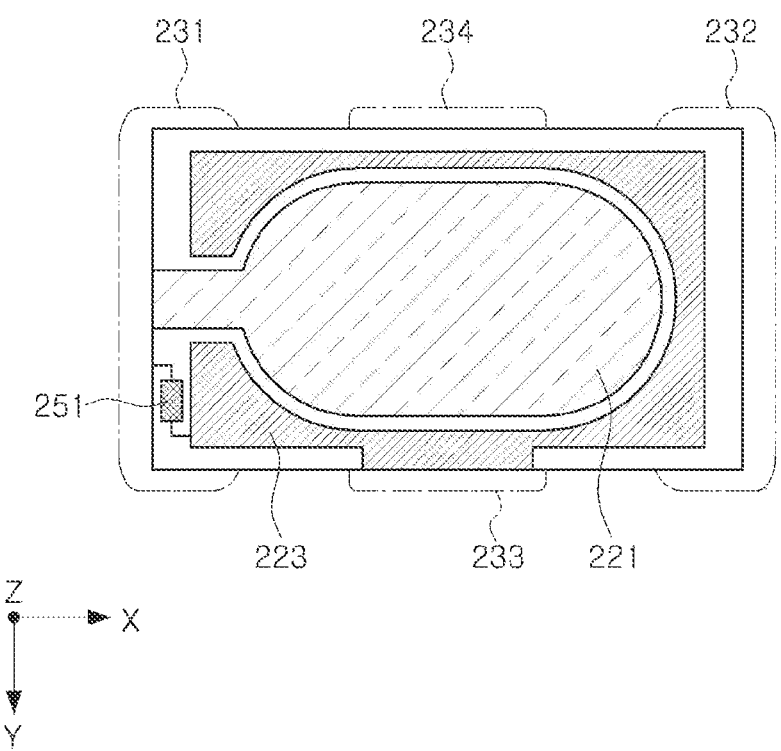
FIGS. 16 and 17 are plan views illustrating a negative electrode, a positive electrode, a sub-negative electrode, and a sub-positive electrode, according to a modified form of the present disclosure.
Figure 17:
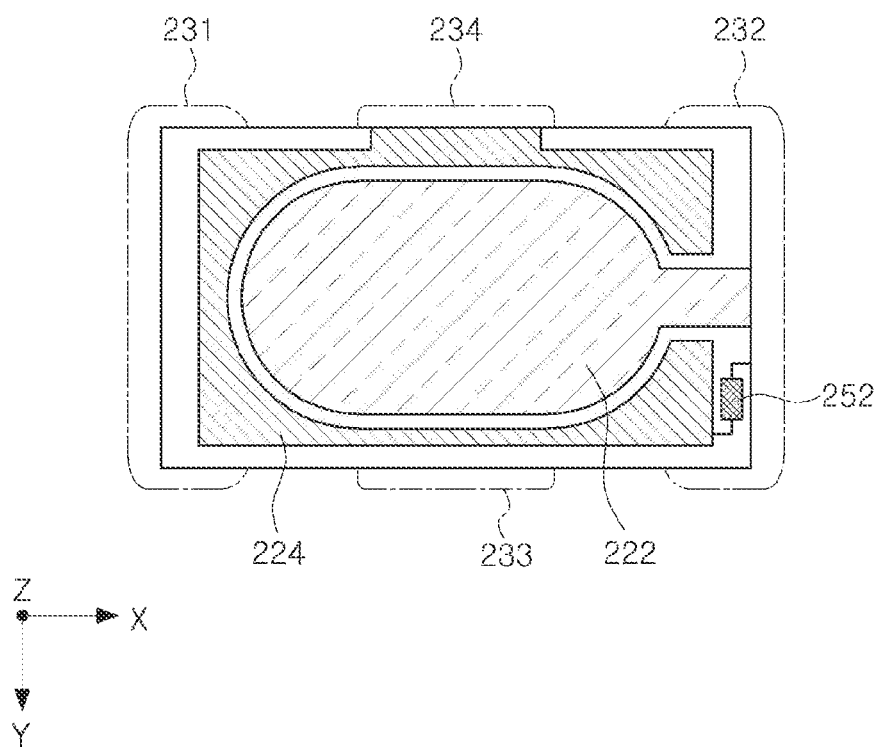

In another embodiment of the present disclosure, a third negative electrode 221' and a third positive electrode 222' of an all-solid-state battery 200 according to the present disclosure may have a square shape. FIGS. 14 and 15 are cross-sectional views of an all-solid-state battery 200 according to this embodiment. As illustrated in FIGS. 14 and 15, a third negative electrode 221' and a third positive electrode 222' of an all-solid-state battery 200 of the present exemplary embodiment may have a square shape. In this case, a fourth negative electrode 223' and a fourth positive electrode 224' may also have a rectangular shape.

An all-solid-state battery according to the present disclosure may further include an insulating layer disposed surrounding the electrode assembly. The insulating layer may include a ceramic material, for example, alumina ($Al_2O_3$), aluminum nitride (AlN), beryllium oxide (BeO), boron nitride (BN), silicon (Si), silicon carbide (SiC), silica ($SiO_2$), silicon nitride ($Si_3N_4$), gallium arsenide (GaAs), gallium nitride (GaN), barium titanate ($BaTiO_3$), zirconium dioxide ($ZrO_2$), mixtures thereof, oxides and/or nitrides of these materials, or any other suitable ceramic materials, but is not limited thereto. In addition, the insulating layer may selectively include the above-described solid electrolyte, and may include one or more solid electrolytes, but is not limited thereto.

The insulating layer may be formed by applying a slurry containing a ceramic material to a surface of an electrode assembly, or may be formed by attaching at least one sheet formed of the ceramic material on both surfaces of the electrode assembly in the second direction (the Y direction) and in the third direction (the Z direction). The insulating layer may fundamentally prevent damage to the electrode assembly due to physical or chemical stress.

A method of forming first to fourth external electrodes of an all-solid-state battery according to the present disclosure is not particularly limited. The first to fourth external electrodes may be formed by applying a terminal electrode paste containing a conductive metal on lead portions of the first to fourth negative electrodes and/or the first to fourth positive electrodes, and baking the paste, but is not limited thereto. The conductive metal may be, for example, one or more conductive metals of copper (Cu), nickel (Ni), tin (Sn), palladium (Pd), platinum (Pt), gold (Au), silver (Ag), tungsten (W), titanium (Ti), lead (Pb), and alloys thereof, but is not limited thereto.

In an example, an all-solid-state battery according to the present disclosure may further include plating layers respectively disposed on the first to fourth external electrodes. The plating layer may include one or more selected from the group consisting of copper (Cu), nickel (Ni), tin (Sn), palladium (Pd), platinum (Pt), gold (Au), silver (Ag), tungsten (W), titanium (Ti), lead (Pb), and alloys thereof, but is not limited thereto. The plating layer may be formed as a single layer or a plurality of layers, and may be formed by sputtering or electroplating, but is not limited thereto.

One of several effects according to the present disclosure may provide an all-solid-state battery capable of suppressing dendrite growth.

One of several effects according to the present disclosure may provide an all-solid-state battery capable of preventing damage due to overcharging.

One of several effects according to the present disclosure may provide an all-solid-state battery having improved electrical properties.

However, various advantages and effects of the present disclosure are not limited to the above-described contents, and can be more easily understood in the course of describing specific embodiments of the present disclosure.

While example embodiments have been illustrated and described above, it will be apparent to those skilled in the art that modifications and variations could be made without departing from the scope of the present disclosure as defined by the appended claims.

What is claimed is:

1. An all-solid-state battery comprising:
   an electrode assembly including first and second surfaces opposing in a first direction, third and fourth surfaces opposing in a second direction, and fifth and sixth surfaces opposing in a third direction, and including a solid electrolyte layer, a first battery unit comprising a first negative electrode and a first positive electrode, and a second battery unit comprising a second negative electrode and a second positive electrode, the first negative and positive electrodes and the second negative and positive electrodes being respectively stacked in the third direction with the solid electrolyte layer interposed therebetween;
   a first external electrode connected to the first negative electrode and disposed on the first surface of the electrode assembly;
   a second external electrode connected to the first positive electrode and disposed on the second surface of the electrode assembly;
   a third external electrode connected to the second negative electrode and disposed on the third surface of the electrode assembly; and
   a fourth external electrode connected to the second positive electrode and disposed on the fourth surface of the electrode assembly,
   wherein the second battery unit is disposed to be adjacent to at least one of the fifth surface or the sixth surface of the electrode assembly,
   the first battery unit is located further inside than the second battery unit in the third direction,
   the first to fourth external electrodes are connected to the first negative and positive electrodes and the second negative and positive electrodes, respectively, as a one-to-one relationship,
   at least one connection electrode is disposed between the first external electrode and the third external electrode and/or between the second external electrode and the fourth external electrode, and
   the at least one connection electrode each comprises two or more bent portions.

2. The all-solid-state battery of claim 1, wherein the at least one connection electrode connects the first external electrode to the third external electrode and/or the second external electrode to the fourth external electrode.

3. The all-solid-state battery of claim 1, further comprising at least one resistor disposed between the first external electrode and the third external electrode and/or between the second external electrode and the fourth external electrode,
   wherein the at least one connection electrode is connected in series with the at least one resistor.

4. The all-solid-state battery of claim 1, further comprising at least one resistor disposed between the first external electrode and the third external electrode and/or between the second external electrode and the fourth external electrode.

* * * * *